Sept. 5, 1967    M. H. GROVE    3,339,882
VALVE CONSTRUCTION
Filed April 22, 1965    2 Sheets-Sheet 1
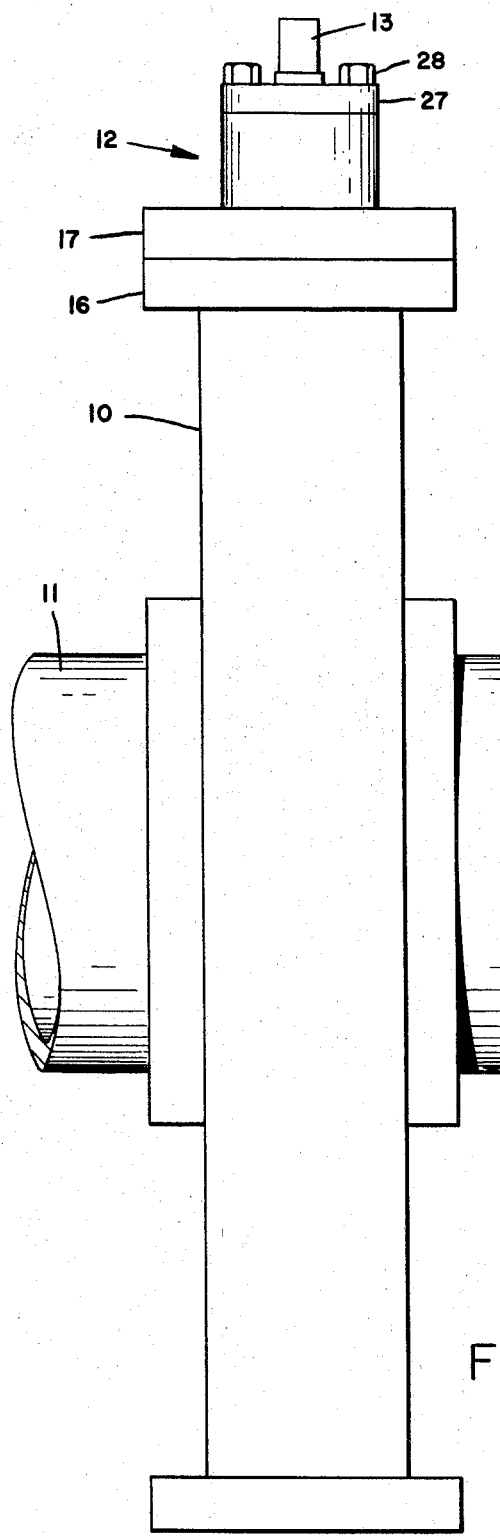
Fig_1
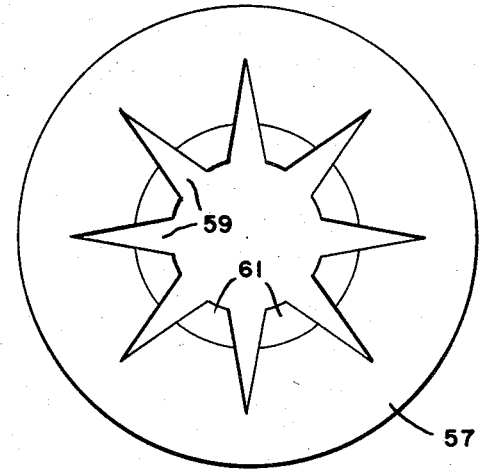
Fig_4
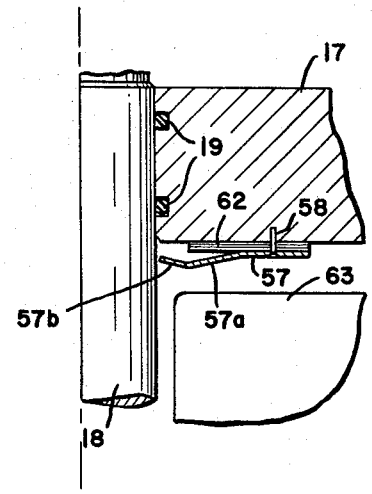
Fig_5
INVENTOR.
MARVIN H. GROVE
BY
ATTORNEYS Sept. 5, 1967  M. H. GROVE  3,339,882
VALVE CONSTRUCTION
Filed April 22, 1965  2 Sheets-Sheet 2
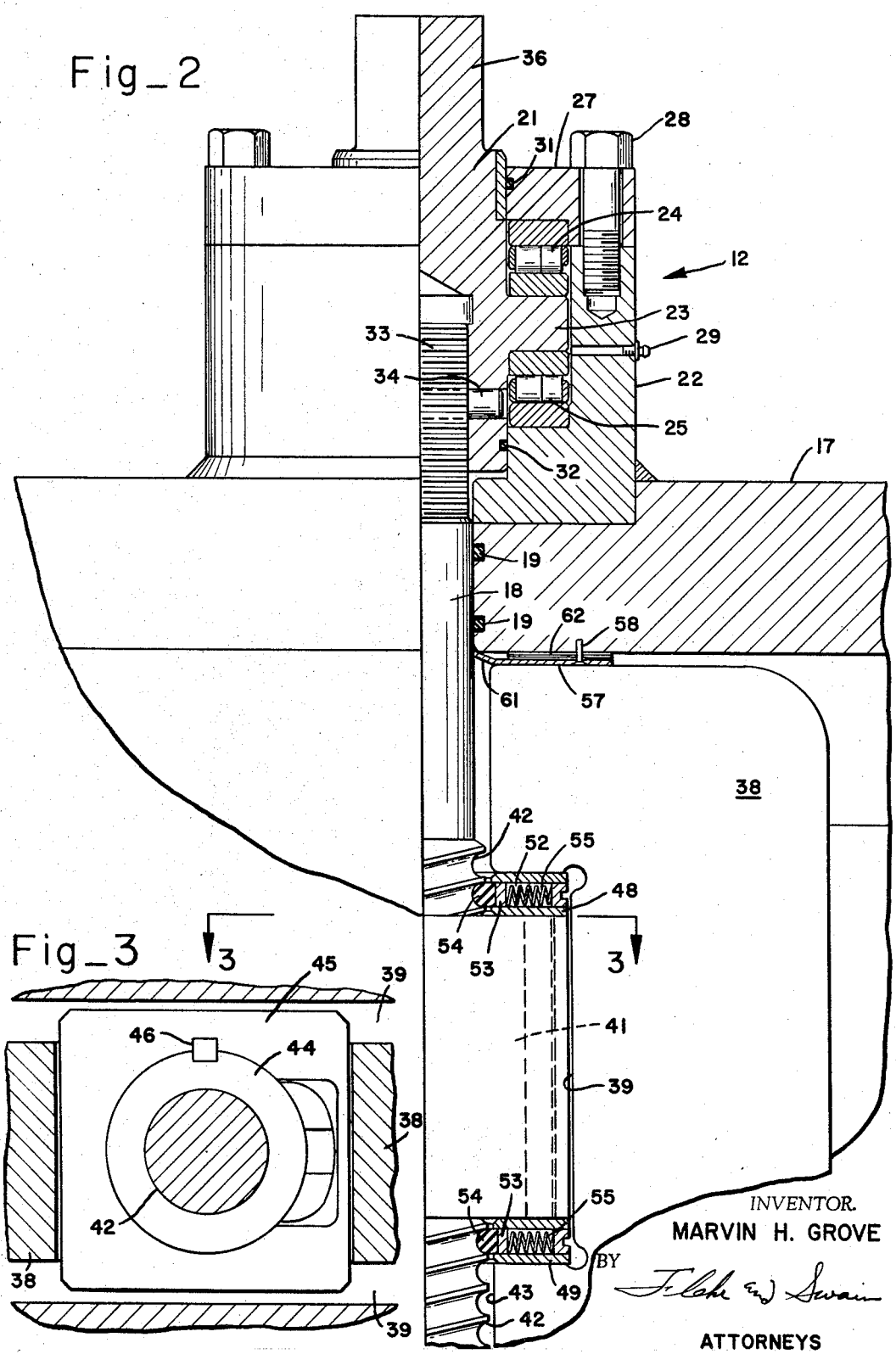
INVENTOR.
MARVIN H. GROVE
BY
ATTORNEYS

United States Patent Office 3,339,882
Patented Sept. 5, 1967

3,339,882
VALVE CONSTRUCTION
Marvin H. Grove, Piedmont, Calif., assignor to M. & J. Valve Company, Houston, Tex., a corporation of Delaware
Filed Apr. 22, 1965, Ser. No. 450,048
8 Claims. (Cl. 251—64)

This invention relates generally to valve constructions of the gate type such as are employed for controlling fluid flow, including liquids and gases.

One type of gate valve which has come into general usage for transmission pipe lines and other purposes employs a slab-like gate having parallel side surfaces and movable vertically between full open and closed positions. The operating means for such valves employs an operating rod or stem which extends through bonnet means at the upper end of valve body, and is operatively connected to the gate. The operating means may be of the rising stem type, in which the rod or stem moves vertically and is directly connected to the gate, or the non-rising stem type in which the operating rod or stem is journalled by a thrust bearing and has a threaded portion which engages a nut carried by the gate. When the valves are made in the larger sizes, considerable force may be required for moving the gate between its operating positions, particularly if the valve must be moved when differential fluid pressure is being applied. In such instances, it has been common to provide special operating means capable of exerting the forces required, as for example, reduction gearing operated by a hand wheel, geared electrical motors, pneumatic and hydraulic cylinders and the like.

Having reference particularly to operators of the type which employ an internally threaded nut that engages a threaded portion of the operating rod or stem, a substantial part of the power required to operate the valve between open and closed positions is occasioned by the friction between the nut and the stem. Although such friction is detrimental in that it greatly increases the power required for operation of the valve, it serves to prevent movement of the gate to a lower position under its own weight. Thus when valves are made in the larger sizes with relatively heavy slab-like gates, friction between the nut and the threads of the operating rod tends to prevent downward movement of the gate under its own weight after the gate has been moved to its upper limiting position.

In general, it is an object of the present invention to provide a gate valve construction having operating means characterized by relatively low friction, and which therefore requires a minimum of power for its operation.

Another object of the invention is to provide a valve construction of the above character which has means to prevent dropping of the gate from an upper position under its own weight.

Another object of the invention is to provide a novel valve construction utilizing operating means which includes a nut of the ball bearing type and which at the same time has means for applying braking torque to the operating rod for the upper limiting position of the gate.

Another object of the invention is to provide valve operating means utilizing a nut of the ball bearing type in conjunction with means for wiping the cooperating threads of the operating rod free of foreign material.

Additional objects and features of the invention will appear from the following description in which the preferred embodiment has been set forth in detail in conjunction with the accompanying drawing.

Referring to the drawing:

FIGURE 1 shows a valve of the gate type having a slab-like gate movable vertically between full open and closed positions;

FIGURE 2 is a detail on an enlarged scale partly in section, showing the means employed for operating the valve gate;

FIGURE 3 is a cross-sectional detail taken along the line 3—3 of FIGURE 2;

FIGURE 4 is a plan view showing the spring means for applying braking torque to the operating rod; and FIGURE 5 is a cross-sectional detail in enlarged scale showing the spring means of FIGURE 4.

The valve as illustrated (FIGURE 1) consists of a body 10 having aligned hubs or pipe sections 11 secured to its end walls. A thrust bearing assembly 12 is mounted upon the upper end of the body. An operating member 13 extends upwardly from the assembly 12 and is adapted to be engaged by a tool or other means for turning the same. Assuming that the valve is of fabricated construction, the body 10 may be rectangular in section, or in other words it is box-like.

FIGURE 2 illustrates the upper portion of a valve of the type shown in FIGURE 1, with my invention incorporated with the same. In general, the upper end of the body is provided with a mounting flange 16, to which is secured the bonnet mounting plate 17. The operating rod 18 extends through the bonnet mounting plate 17, suitable means being provided to prevent leakage, such as the seal rings 19 of the O-ring type. The assembly 12 can consist of the member 13 in the form of a short stud shaft enclosed within the body 22. Shaft 13 is provided with a flange 23 that is disposed between the roller bearing assemblies 24 and 25, the latter being enclosed within the body 22. Assemblies 24 and 25 are retained in proper operating position by the top closure 27, which is clamped upon the top of the body 22 as by means of studs 28. Lubricant can be introduced into the assemblies 24 and 25 through the fitting 29. Lubricant seals, such as the resilient O-rings 31 and 32, are provided to prevent leakage of lubricant. The lower portion of the stud shaft 21 is internally threaded to engage the upper threaded end portion 33 of the operating rod 18. Also a drive pin 34 is provided during assembly to lock the stud shaft upon the operating rod. The upper end portion 36 of the stud shaft 13 is squared or otherwise formed to engage a tool or other turning means.

The gate 38 is of the slab type having side faces which are planar and parallel. It may be provided with a port which registers with the flow passages of the body for full open position of the valve. Generally the arrangement is such that the gate is in its uppermost limiting position for full open position of the valve, and is lowered to its full closed position. The upper portion of this gate is provided with a keyhole shaped opening 39 which accommodates the nut assembly 41. The nut engages the threads 42 on the operating rod 18. To provide a minimum amount of friction between the nut and the operating rod, I employ a nut assembly of the ball bearing thread type. Such nuts utilize a plurality of metal ball bearings that are retained in a helicoidal path or paths, together with means for automatically transposing ball bearings from one end of the helicoidal path or paths to the other. To cooperate with such a nut assembly, the threads on the rod 18 are machined in the manner illustrated, thereby providing valley surfaces conforming to the arc of a circle. Suitable nuts of this type are manufactured by Saginaw Gear Works of Saginaw, Michigan.

Although it is possible to use threads comprising a single helix, it is desirable to utilize double or triple threads to provide greater motion for a given amount of turning movement of the operating rod. FIGURE 2 illustrates the use of a double helix whereby the gate is moved a distance equal to the distance between the centers of two threads for one revolution of the rod. Below the nut 41 the gate is provided with a bore 43 to accommodate that part of the rod extending below the nut.

The nut assembly 41 consists of an inner barrel 44 which is fixed within the body 45. These two parts are locked together as by means of the key 46. As shown in FIGURE 3, the body 45 is square or rectangular in configuration and fits between the side surfaces of the keyhole shaped opening 39. Thus the nut assembly is retained non-rotatable with respect to the gate.

Adjacent the upper and lower ends of the nut assembly 41 I provide thrust washers 48 and 49. These washers minimize lost motion in a vertical direction between the nut assembly and the gate. They may be square in plan to conform to the shape of body 45, whereby they are non-rotatable relative to the gate.

Each of the thrust washers 48 and 49 preferably are provided with wiper means engaging the adjacent threads of the operating rod. Thus in each instance a radially extending bore 52 is provided which accommodates a plunger-like member 53. The end portion 54 of this member can be made of suitable material, such as spring metal gauze, metal wool, sponge rubber or the like, which seats in and conforms with a valley between adjacent threads. The wiper means for the lower thrust washer 49 can be the same as for the washer 48. In addition, diametrically opposite portions of the washers 48 and 49 can be provided with similar wiper assemblies, assuming that double pitch threads are employed. Compression springs 55 serve to urge the members 53 toward proper wiping engagement.

As previously stated, the use of a nut assembly of the ball bearing thread type provides a minimum amount of friction resisting turning movement between the operating rod and the nut assembly. Under certain operating conditions the friction resisting movement between the gate and the body may be relatively low. Thus when the gate is raised by turning the operating rod, the weight of the gate may be sufficient to cause backward movement of the rod 18. In other words, the gate may automatically move by its own weight from its upper to its lowermost position. To prevent this type of uncontrolled movement of the gate, I employ means whereby when the gate is moved to its upper limiting position, braking torque is automatically applied to resist turning of the operating rod. Thus, referring to FIGURE 5, I have shown a spring washer 57 which surrounds the operating rod and which is attached as by means of screws 58 to the underside of the bonnet mounting plate 17. As shown in FIGURE 4, this washer is provided with radially extending slots 59 which define sectors 61 that are circumferentially spaced about the operating rod. The washer is dished somewhat as illustrated in FIGURE 5. Thus as viewed in section, the annular portion 57a is dished downwardly a limited amount and the inner portion 57b, which comprises the sectors 61, is inclined upwardly. Annular spacers 62 are shown interposed between the spring washer 57 and the adjacent bottom face of the mounting plate 16, thus retaining the spring washer in a proper position for engagement with the upper end of the gate.

FIGURE 5 shows one of the upper end portions 63 of the gate being spaced a short distance below the spring washer 57. When the gate is moved upwardly to its uppermost limiting position, it engages and distorts the spring washer substantially in the manner illustrated in FIGURE 2, and this in turn causes the inner ends of the sectors 61 to be urged into braking engagement with the periphery of the operating rod. Thus sufficient braking torque is applied to the operating rod to prevent its back rotation under the weight of the gate.

It will be evident from the foregoing that I have provided a gate valve having a number of desirable features. Because of the use of a nut assembly of the ball bearing type, the valve can be operated between full open and closed positions with a minimum amount of effort. This greatly simplifies the type of means utilized for turning the operating rod, whether this be operated manually or by power. Although the nut provides a minimum amount of friction, the gate is held in its raised position by virtue of the spring washer 57 which automatically applies torque to the operating rod. The nut assembly is maintained in proper operating condition by virtue of the fact that the threads are wiped clear of foreign solids during movement of the gate upwardly or downwardly. Thus the portions of the thread within the nut assembly are always relatively free of foreign material, irrespective of the presence of foreign material within the body space.

I claim:

1. In a gate valve construction, a body having flow passages, a flat gate disposed within the body and movable between open and closed positions relative to the flow passages, bonnet means carried by one end of the body, a rotatable operating rod extending through the bonnet means, means forming a thrust bearing for the operating rod, a nut having non-rotatable engagement with one end of the gate, the rod having a threaded portion that is operatively engaged with the nut whereby rotation of the rod effects movement of the gate between open and closed limiting positions, and means in addition to and acting independently of the nut to apply braking torque to the rod when the gate is moved to one of said limiting positions.

2. A gate valve construction as in claim 1 in which said last-named means serves to apply braking torque to the rod when the gate is moved to the upper one of its limiting positions.

3. A gate valve construction as in claim 1 in which said braking means comprises a spring member mounted on the body adjacent the rod, said spring member being engaged by the gate to urge the same into braking engagement with the rod when the gate is moved to its uppermost limiting position.

4. A valve construction as in claim 3 in which the spring member is in the form of an annular member that surrounds the rod.

5. In a gate valve construction, a body having aligned openings forming flow passages, a flat gate disposed within the body and movable vertically between limiting full open and closed positions relative to the flow passages, bonnet means carried by the upper end of the body, a rotatable operating rod extending through the bonnet means, means mounted upon the bonnet means forming a thrust bearing for the operating rod, a nut having non-rotatable engagement with one end of the gate, the rod having a threaded portion that is operatively engaged within the nut whereby rotation of the rod effects movement of the gate, and means in addition to and acting independently of the nut to apply braking torque to the rod when the gate is moved to its upper limiting position.

6. A valve construction as in claim 5 together with wiper means in addition to and disposed adjacent the upper and lower ends of the nut and having wiping engagement with the threads of the operating rod.

7. A valve construction as in claim 6 in which said wiper means are carried by thrust washers disposed at the upper and lower ends of the nut.

8. A valve construction as in claim 7 in which said nut and said washer means are accommodated within a keyhole-shaped opening formed in the upper end portion of the gate.

References Cited

UNITED STATES PATENTS 2,738,684  3/1956  Shafer _____ 251—267 X
3,223,380  12/1965  Hochmuth _____ 251—327 X M. CARY NELSON, *Primary Examiner.*

J. W. KNIGHT, *Assistant Examiner.*